US012769054B2

(12) United States Patent
Lee

(10) Patent No.: US 12,769,054 B2
(45) Date of Patent: Oct. 20, 2026

(54) INPUT DEVICE

(71) Applicant: LITE-ON TECHNOLOGY CORPORATION, Taipei (TW)

(72) Inventor: Kuei-Ming Lee, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 335 days.

(21) Appl. No.: 18/404,928

(22) Filed: Jan. 5, 2024

(65) Prior Publication Data

US 2024/0230989 A1 Jul. 11, 2024

Related U.S. Application Data

(60) Provisional application No. 63/437,391, filed on Jan. 6, 2023.

(51) Int. Cl.

*G02B 6/122* (2006.01)
*F21V 8/00* (2006.01)
*G06F 3/041* (2006.01)

(52) U.S. Cl.

CPC ........... *G02B 6/122* (2013.01); *G02B 6/0036* (2013.01); *G06F 3/041* (2013.01)

(58) Field of Classification Search

CPC .............................. G02B 6/0036; G06F 3/041
See application file for complete search history.

(56) References Cited

U.S. PATENT DOCUMENTS

2008/0247152 A1* 10/2008 Chen .................... G02B 6/0036
362/23.03

FOREIGN PATENT DOCUMENTS

| | | | | |
|---|---|---|---|---|
| CN | 101598865 A | * 12/2009 | | |
| CN | 102043188 A | * 5/2011 | | |
| CN | 112306264 A | * 2/2021 | .............. | F21V 23/04 |
| TW | 201217843 A | 5/2012 | | |
| WO | WO-9963394 A1 | * 12/1999 | ............. | G06F 3/045 |

OTHER PUBLICATIONS

CN-102043188-A English translation (Year: 2011).*
CN-101598865-A English translation (Year: 2009).*
Office Action issued by Taiwan Intellectual Property Office on Dec. 6, 2024.

* cited by examiner

*Primary Examiner* — Charlie Y Peng
(74) *Attorney, Agent, or Firm* — WPAT, PC

(57) ABSTRACT

An input device includes a light guide element, a first adhesive layer and a second adhesive layer. The light guide element has a first side and a second side relative to the first side. The first adhesive layer is disposed corresponding to the first side and includes a first substance portion. The second adhesive layer is disposed corresponding to the second side and includes a second substance portion. The first substance portion and the second substance portion overlap in an orientation of the input device.

17 Claims, 9 Drawing Sheets

INPUT DEVICE

This application claims the benefit of US provisional application Ser. No. 63/437,391, filed Jan. 6, 2023, the subject matter of which is incorporated herein by reference

TECHNICAL FIELD

The disclosure relates in general to an input device.

BACKGROUND

An input device may accept a user's touch command. In order to facilitate use in an environment with insufficient light, the input device may include a light guide and a light source, wherein the light emitted by the light source may be guided to illuminate the input device through the light guide. However, the light in an optical path is easily blocked and results in light loss. Therefore, how to reduce the light loss in the optical path of light is the goal of industry players in this technical field.

SUMMARY

The present disclosure provides an electronic system and an electronic device thereof capable of resolving the conventional problem.

According to an embodiment, an input device is provided. The input device includes a light guide element, a first adhesive layer and a second adhesive layer. The light guide element has a first side and a second side relative to the first side. The first adhesive layer is disposed corresponding to the first side and includes a first substance portion. The second adhesive layer is disposed corresponding to the second side and includes a second substance portion. The first substance portion and the second substance portion overlap in an orientation of the input device.

According to another embodiment, an input device is provided. The input device includes a light guide element and a microstructure layer. The microstructure layer is disposed on the light guide element and includes a first region and a second region. The first region overlaps a light-transmissive area in an orientation of the input device, the second region overlaps a light-shielding area in the orientation, the first region has a first microstructure density, the second region has a second microstructure density, and the first microstructure density is different from the second microstructure density.

According to another embodiment, an input device is provided. The input device includes a light guide element, a microstructure layer, a first adhesive layer and a second adhesive layer. The light guide element has a first side and a second side relative to the first side. The microstructure layer is disposed on the light guide element and includes a first region and a second region, wherein the first region has a first microstructure density, the second region has a second microstructure density, and the first microstructure density is different from the second microstructure density. The first adhesive layer continuously extends on the first side. The second adhesive layer continuously extends on the second side. The first adhesive layer and the second adhesive layer overlap the first region in an orientation of the input device.

The above and other aspects of the disclosure will become better understood with regard to the following detailed description of the preferred but non-limiting embodiment (s). The following description is made with reference to the accompanying drawings.

DETAILED DESCRIPTION

Figure 1A:
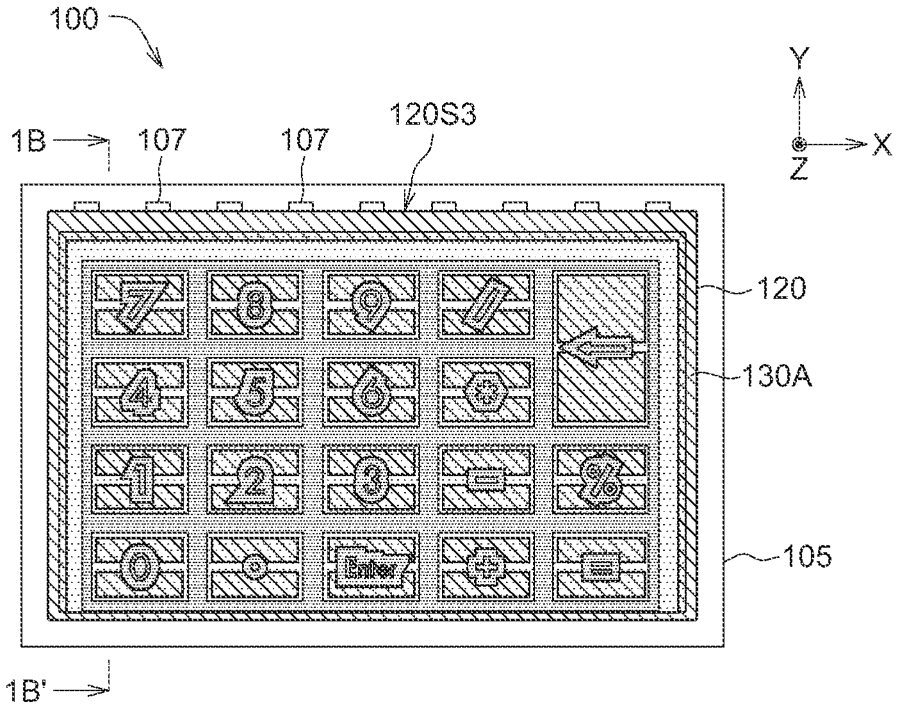
FIG. 1A illustrates a schematic diagram of a top view of the input device according to an embodiment of the present invention.
Figure 1B:
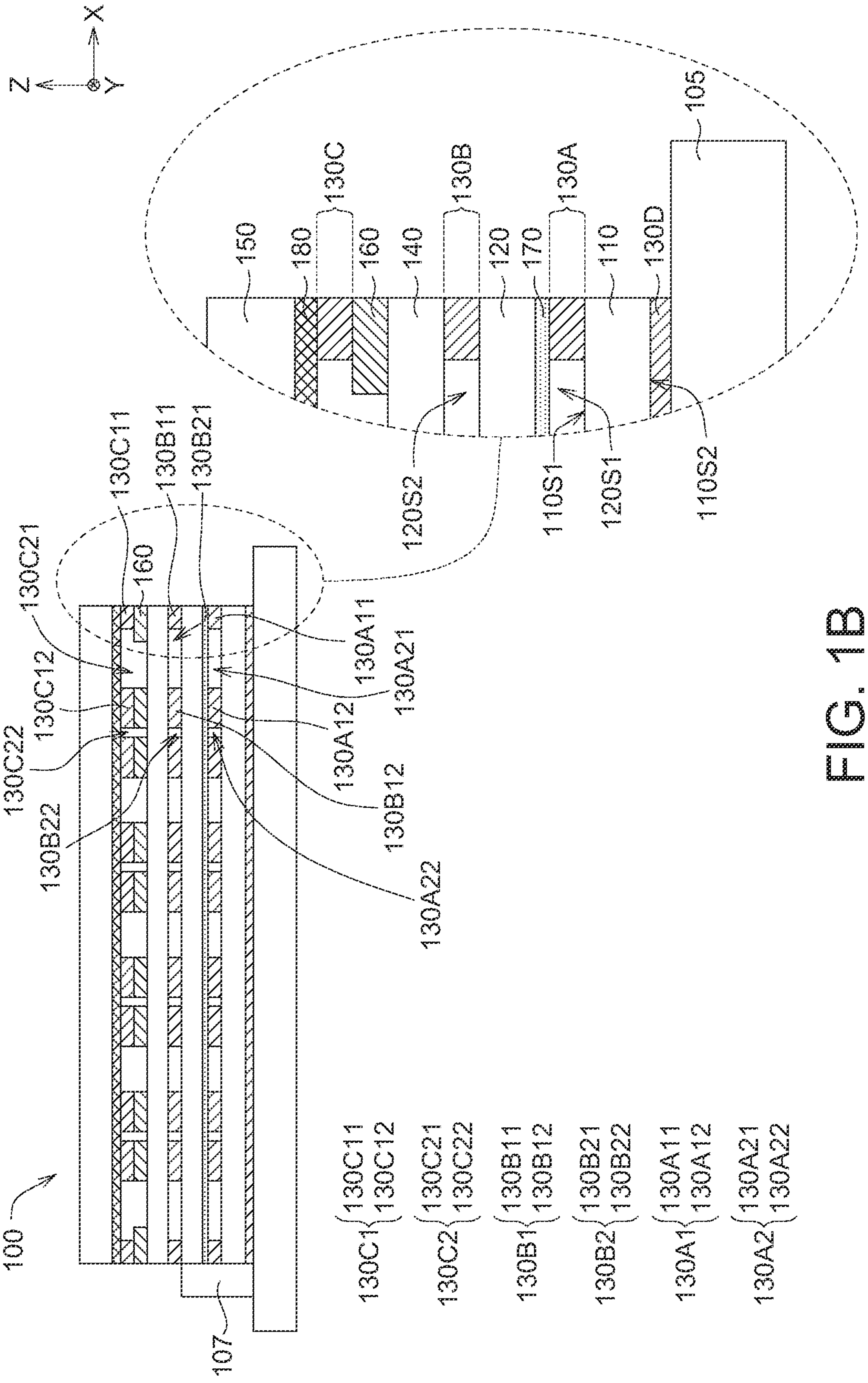
FIG. 1B illustrates a schematic diagram of a cross-sectional view of the input device in FIG. 1A along a direction 1B-1B'.
Figure 2:
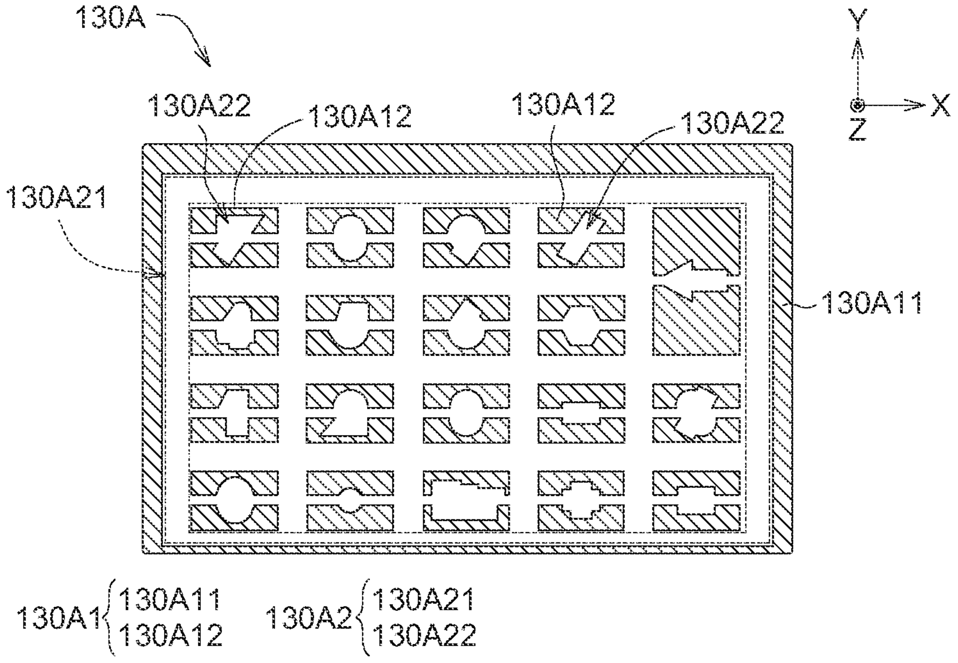
FIG. 2 illustrates a schematic diagram of a top view of a first adhesive layer in FIG. 1B.
Figure 3:
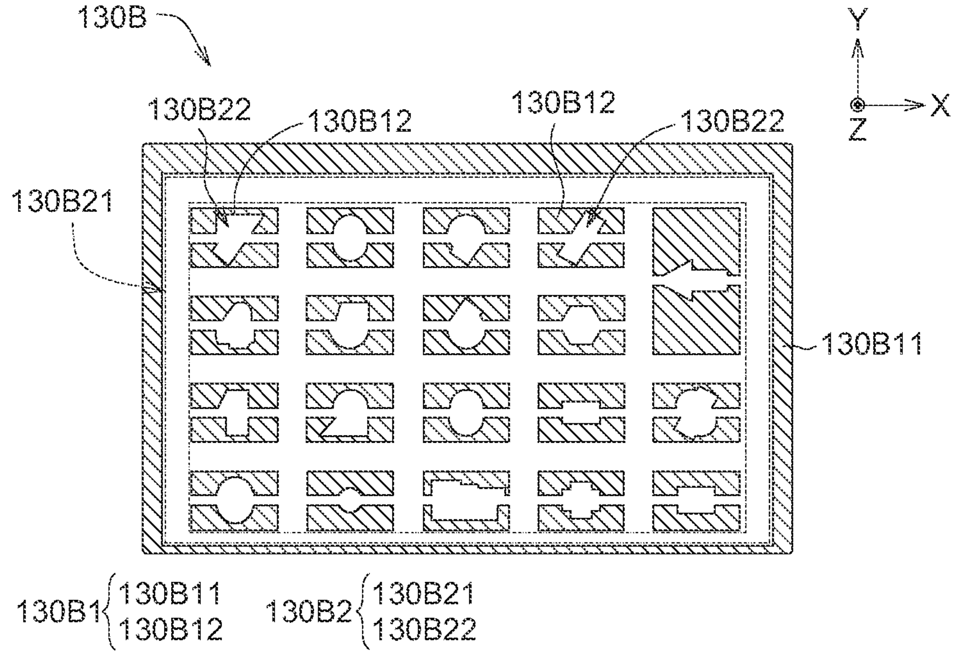
FIG. 3 illustrates a schematic diagram of a top view of a second adhesive layer in FIG. 1B.
Figure 4:
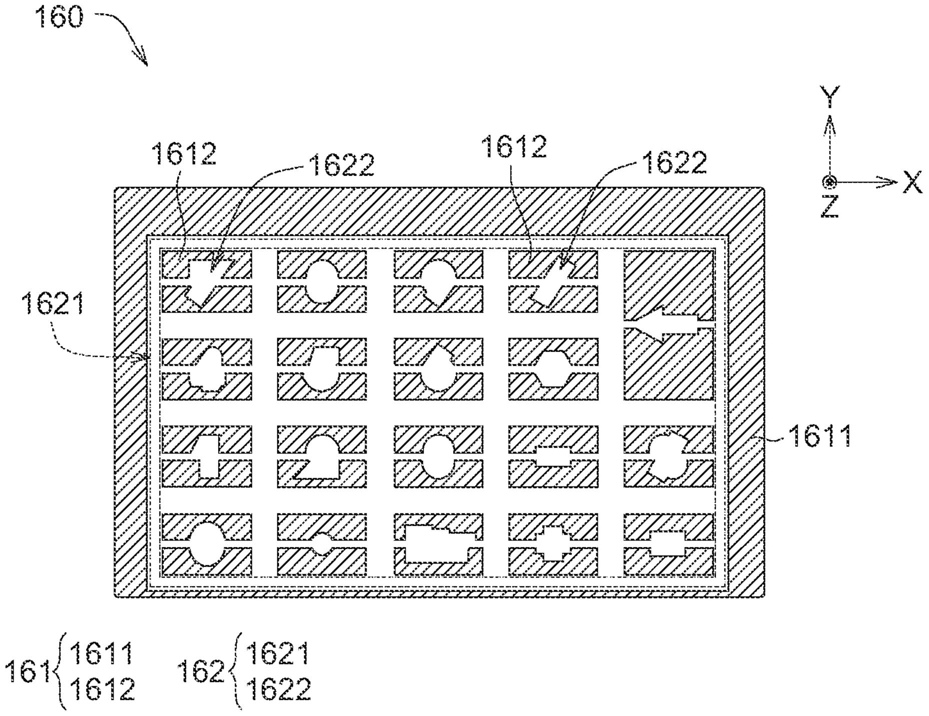
FIG. 4 illustrates a schematic diagram of a first patterned layer in FIG. 1B.
Figure 5A:
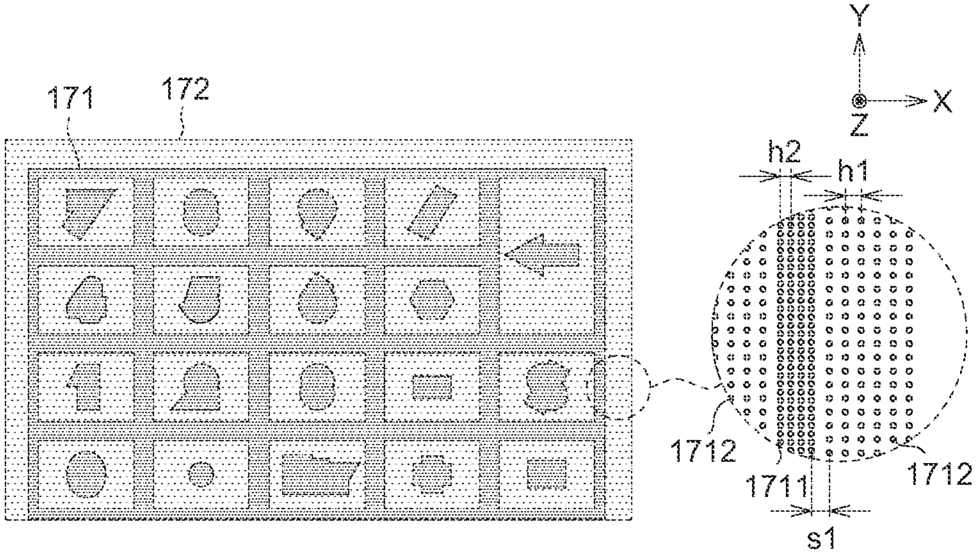
FIG. 5A illustrates a schematic diagram of a top view of a microstructure layer in FIG. 1B.
Figure 5B:
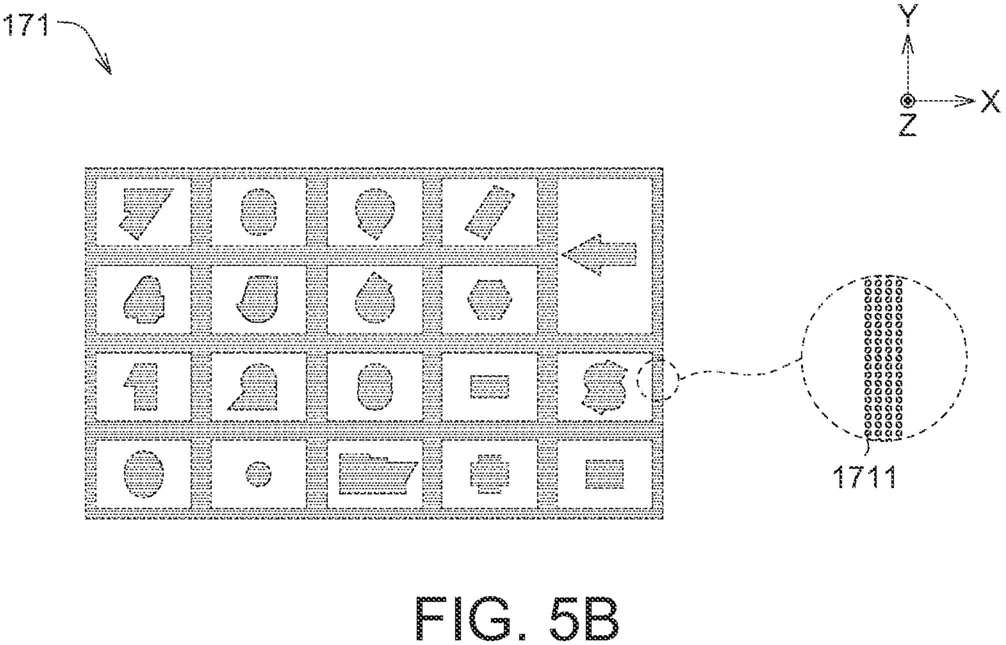
FIG. 5B illustrates a schematic diagram of a top view of a first region of the microstructure layer in FIG. 5A.
Figure 5C:
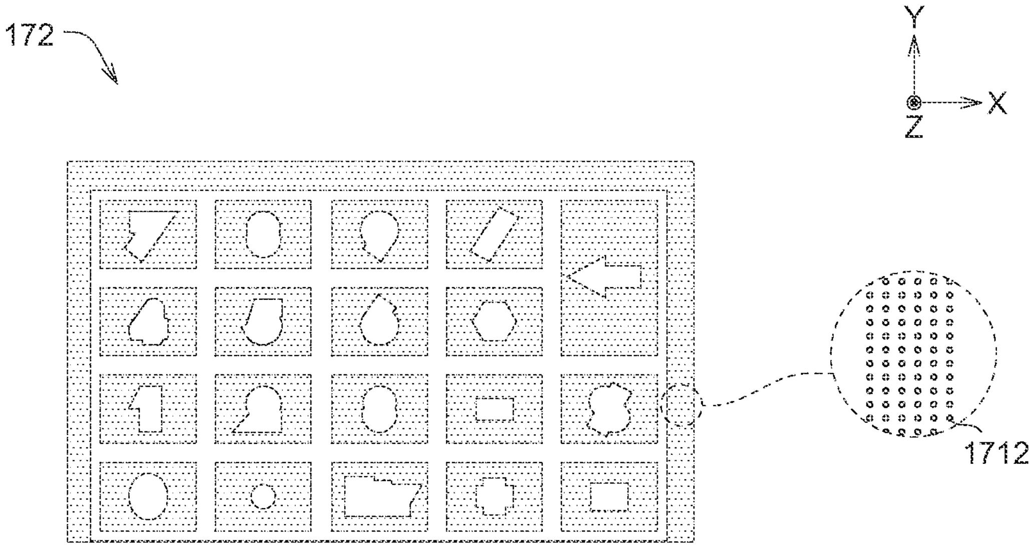
FIG. 5C illustrates a schematic diagram of a second region of the microstructure layer in FIG. 5A.
Figure 6:
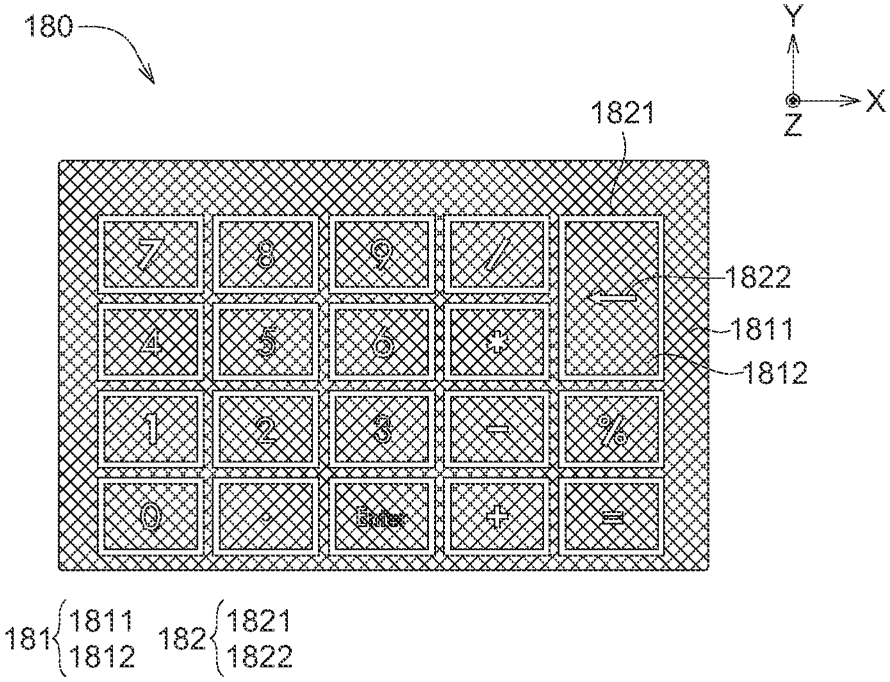
FIG. 6 illustrates a schematic diagram of a top view of a second patterned layer in FIG. 1B.

Referring to FIGS. 1A to 6, FIG. 1A illustrates a schematic diagram of a top view of the input device 100 according to an embodiment of the present invention, FIG. 1B illustrates a schematic diagram of a cross-sectional view of the input device 100 in FIG. 1A along a direction 1B-1B', FIG. 2 illustrates a schematic diagram of a top view of a first adhesive layer 130A in FIG. 1B, FIG. 3 illustrates a schematic diagram of a top view of a second adhesive layer 130B in FIG. 1B, FIG. 4 illustrates a schematic diagram of a first patterned layer 160 in FIG. 1B, FIG. 5A illustrates a schematic diagram of a top view of a microstructure layer 170 in FIG. 1B, FIG. 5B illustrates a schematic diagram of a top view of a first region 171 of the microstructure layer 170 in FIG. 5A, and FIG. 5C illustrates a schematic diagram of a second region 172 of the microstructure layer 170 in FIG. 5A, and FIG. 6 illustrates a schematic diagram of a top view of a second patterned layer 180 in FIG. 1B.

The input device 100 is, for example, a touch panel, a touch bar that may be applied to a notebook computer, or other electronic device that require touch input.

As illustrated in FIGS. 1A and 1B, the input device 100 includes a circuit board 105, at least one light source 107, a reflective element 110, a light guide element 120, the first adhesive layer 130A, the second adhesive layer 130B, and a third adhesive layer. 130C, a fourth adhesive layer 130D, an insulation element 140, a light-transmissive element 150, the first patterned layer 160, the microstructure layer 170 and the second patterned layer 180.

As illustrated in FIGS. 1A and 1B, the light guide element 120 has a first side 120S1 and a second side 120S2 relative to the first side 120S1. The first adhesive layer 130A is disposed corresponding to the first side 120S1 and includes at least one first substance portion 130A1. The second adhesive layer 130B is disposed corresponding to the second side 120S2 and includes at least one second substance portion 130B1. The first substance portion 130A1 and the second substance portion 130B1 overlap in a direction Z of the input device 100. The direction Z is, for example, a stacking orientation or a touch-sensing orientation of the input device 100. In an embodiment, the direction Z may be an orientation perpendicular to an extending orientation of a light-emitting surface of the light guide element 120 (for example, the XY plane direction). Due to the first substance portion 130A1 and the second substance portion 130B1 overlapping, a light-transmissive area of the adhesive layer (for example, the area where the light does not pass through the physical layer) may be expanded, thereby reducing the light loss.

Although not illustrated, the circuit board 105 includes a touch circuit layer. The touch circuit layer may generate a touch signal to a processor (not illustrated) in response to a user's touch, and the processor accordingly performs a corresponding function.

As illustrated in FIGS. 1A and 1B, the light source 107 is disposed adjacent to a side surface 120S3 of the light guide element 120. The light emitted by the light source 107 is incident into the light guide element 120 through the side surface 120S3, and the light is emitted from the second side (light exit side) 120S2 of the light guide element 120. Although not illustrated, in another embodiment, the reflective element 110 and the light guide element 120 each have a through hole, and the light source 107 may be disposed through the through hole of the reflective element 110 and the through hole of the light guide element 120.

As illustrated in FIG. 1B, the reflective element 110 is disposed between the circuit board 105 and the light guide element 120. The reflective element 110 may reflect the light back to the light guide element 120. The reflective element 110 has a first surface 110S1 and a second surface 110S2 relative to the first surface 110S1. Although not shown, the input device 100 further includes a reflective layer formed on the first surface 110S1 or the second surface 110S2 of the reflective element 110.

In the present embodiment, the light guide element 120 is formed of a light-transmissive material, for example, plastic, glass, etc. In an embodiment, the light guide element 120 is, for example, a light guide film (LGF), and its thickness ranges between, for example, 0.3 millimeter (mm) and 0.6 mm.

As illustrated in FIGS. 1B, 2 and 3, the first adhesive layer 130A has a first hollow pattern area 130A2, the second adhesive layer 130B has a second hollow pattern area 130B2, and the third adhesive layer 130C has a third hollow pattern area 130C2. In an embodiment, at least two of the first hollow pattern area 130A2, the second hollow pattern area 130B2, and the third hollow pattern area 130C2 may at least partially overlap along the direction Z of the input device 100. As a result, the multiple adhesive layers may provide multiple hollow pattern areas arranged sequentially along the direction Z, so as to reduce the light loss of the light passing through them.

As illustrated in FIG. 1B, the first adhesive layer 130A is formed between the reflective element 110 and the light guide element 120 to bond the reflective element 110 and the light guide element 120. The first adhesive layer 130A is, for example, a light-transmissive layer. In an embodiment, the light transmittancy of the first adhesive layer 130A is greater than 80%, for example. In an embodiment, the light transmittancy of the first adhesive layer 130A may range between 85% and 98%.

As illustrated in FIG. 2, the first hollow pattern area 130A2 of the first adhesive layer 130A includes a first sub-hollow pattern area 130A21 and at least one second sub-hollow pattern area 130A22. The first sub-hollow pattern area 130A21 surrounds the second sub-hollow pattern area 130A22. For example, the first sub-hollow pattern area 130A21 closely surrounds (or encircles) all second sub-hollow pattern areas 130A22. In addition, the first substance portion 130A1 of the first adhesive layer 130A includes a first sub-substance portion 130A11 and at least one second sub-substance portion 130A12. The first sub-substance portion 130A11 surrounds the first hollow pattern area 130A2 and all second sub-substance portions 130A12. The first sub-substance portion 130A11 may increase an edge combination between the reflective element 110 and the light guide element 120. Each second sub-substance portion 130A12 surrounds the corresponding second sub-hollow pattern area 130A22. In addition, each second sub-hollow pattern area 130A22 has different shape or the same shape. Due to there being no physical material of the adhesive layer in the first hollow pattern area 130A2, it has better light transmittancy (compared to the physical material of the adhesive layer formed in the first hollow pattern area 130A2).

As illustrated in FIG. 3, the second adhesive layer 130B is formed between the light guide element 120 and the insulation element 140 to bond the light guide element 120 and the insulation element 140. The second adhesive layer 130B is, for example, a light-transmissive layer. In an embodiment, the light transmittancy of the second adhesive layer 130B is greater than 80%, for example. In an embodiment, the light transmittancy of the second adhesive layer 130B may range between 85% and 98%. The second adhesive layer 130B has a structure similar to or the same as that of the first adhesive layer 130A.

As illustrated in FIG. 3, the second hollow pattern area 130B2 of the second adhesive layer 130B includes a third sub-hollow pattern area 130B21 and at least one fourth sub-hollow pattern area 130B22. The third sub-hollow pattern area 130B21 surrounds the fourth sub-hollow pattern area 130B22. For example, the third sub-hollow pattern area 130B21 closely surrounds all fourth sub-hollow pattern areas 130B22. In addition, the second substance portion 130B1 of the second adhesive layer 130B includes a third sub-substance portion 130B11 and at least one fourth sub-substance portion 130B12. The third sub-substance portion 130B11 surrounds the second hollow pattern area 130B2 and all fourth sub-substance portions 130B12. The third sub-substance portion 130B11 may increase an edge combination between the light guide element 120 and the insulation element 140. Each fourth sub-substance portion 130B12 surrounds the corresponding fourth sub-hollow pattern area 130B22. In addition, the four hollow pattern areas 130B22 have different shapes or the same shapes. Due to there being no physical material of the adhesive layer in the second hollow pattern area 130B2, it has better light transmittancy (compared to the physical material of the second hollow pattern area 130B2 formed with the adhesive layer).

As illustrated in FIG. 1B, the third adhesive layer 130C is formed between the insulation element 140 and the light-transmissive element 150 to bond the insulation element 140 and the light-transmissive element 150. The material of the third adhesive layer 130C is the same as or similar to that of the aforementioned first adhesive layer 130A, and it will not be repeated here. The third adhesive layer 130C has a structure similar to or the same as that of the aforementioned first adhesive layer 130A and/or the second adhesive layer 130B.

As illustrated in FIG. 1B, the third hollow pattern area 130C2 of the third adhesive layer 130C includes a fifth sub-hollow pattern area 130C21 and at least one sixth sub-hollow pattern area 130C22. The fifth sub-hollow pattern area 130C21 surrounds the sixth sub-hollow pattern area 130C22. For example, the fifth sub-hollow pattern area 130C21 closely surrounds all sixth sub-hollow pattern areas 130C22. In addition, the third adhesive layer 130C includes a third substance portion 130C1. At least two of the third substance portion 130C1, the first substance portion 130A1 and the second substance portion 130B1 may at least partially overlap along the direction Z of the input device 100. Due to at least two of the first substance portion 130A1, the second substance portion 130B1 and the third substance portion 130C1 overlapping, the light-transmissive area of the adhesive layer (for example, the area where the light does not pass through the physical layer) may be expanded, thereby reducing the light loss.

As illustrated in FIG. 1B, the third substance portion 130C1 of the third adhesive layer 130C includes a fifth sub-substance portion 130C11 and at least one sixth sub-substance portion 130C12. The fifth sub-substance portion 130C11 closely surrounds all the sixth sub-substance portions 130C12. The fifth sub-substance portion 130C11 may increase an edge combination of the insulation element 140 and the light-transmissive element 150. Each sixth sub-substance portion 130C12 surrounds the corresponding sixth hollow pattern area 130C22. In addition, each sixth hollow pattern area 130C22 has different shape or the same shape. Due to there being no physical material of the adhesive layer in the third hollow pattern area 130C2, it has better light transmittancy (compared to the physical material of the adhesive layer formed in the third hollow pattern area 130C2).

In an embodiment, the fourth adhesive layer 130D is formed between the circuit board 105 and the reflective element 110 to bond the circuit board 105 and the reflective element 110. The material of the fourth adhesive layer 130D is the same as or similar to that of the aforementioned first adhesive layer 130A, and it will not be repeated here. In addition, the fourth adhesive layer 130D is, for example, an intact layer (e.g., a full-surface coating layer), that is, the fourth adhesive layer 130D does not have a hollow pattern area and/or completely fills the gap between the circuit board 105 and the reflective element 110.

In addition, the first adhesive layer 130A, the second adhesive layer 130B, the third adhesive layer 130C and the fourth adhesive layer 130D may be formed of the same material.

As illustrated in FIGS. 1A and 1B, the insulation element 140 is disposed between the light guide element 120 and the light-transmissive element 150. In an embodiment, the insulation element 140 is formed of a light-transmissive material, for example, plastic, glass, etc. In an embodiment, the insulation element 140 may also be called "Mylar".

As illustrated in FIG. 1B, the light-transmissive element 150 is formed of plastic or glass, for example. The light-transmissive element 150 is, for example, the outermost element of the input device 100 and is configured to receive a touch action of the user. The light-transmissive element 150 has excellent wear-resistant properties and may reduce wear caused by long-term touch. In the present embodiment, the input device 100 has a flat outer surface, upper surface and/or touch surface.

As illustrated in FIG. 4, the first patterned layer 160 is formed on the insulation element 140. In an embodiment, the third adhesive layer 130C may be pre-formed on the insulation element 140 and adhered to the light-transmissive element 150 through the third adhesive layer 130C. The first patterned layer 160 is formed of, for example, a light-shielding material, such as black ink. The first patterned layer 160 has a light-shielding area 161 (for example, a cross-sectional area in FIG. 4) and a light-transmissive area 162 (for example, a non-cross-sectional area in FIG. 4), wherein the light-shielding area 161 is an area coated with black ink, while the light-transmissive area 162 is an area without black ink. In an embodiment, at least two of the first substance portion 130A1, the second substance portion 130A1 and the third substance portion 130C1 correspond to the light-shielding area of the first patterned layer 160 along the direction Z of the input device 100. For example, the area where the first substance portion 130A1, the second substance portion 130A1 and the third substance portion 130C1 are projected on the first patterned layer 160 completely overlaps or at least partially overlaps with the light-shielding area 161. As a result, due to the materials with lower light transmittancy (e.g., the substance portion and the light-shielding area) overlap each other, the area with higher light transmittancy may be expanded.

In an embodiment, at least two of the first hollow pattern area 130A2, the second hollow pattern area 130B2 and the third hollow pattern area 130C2 correspond to the light-transmissive area 162 of the first patterned layer 160 along the direction Z of the input device 100. For example, the area where the first hollow pattern area 130A2, the second hollow pattern area 130B2 and the third hollow pattern area 130C2 are projected on the first patterned layer 160 completely overlaps or at least partially overlaps with the light-transmissive area 162. As a result, the light may continuously travel through the areas with higher light transmittancy (the first hollow pattern area 130A2, the second hollow pattern area 130B2, the third hollow pattern area 130C2 and the light-transmissive area 162 of the first patterned layer 160) for reducing the light loss.

As illustrated in FIG. 4, the light-transmissive area 162 of the first patterned layer 160 includes a first sub-light-transmissive area 1621 and at least one second sub-light-transmissive area 1622. The first sub-light-transmissive area 1621 surrounds the second sub-light-transmissive area 1622. For example, the first sub-light-transmissive area 1621 closely surrounds all second sub-light-transmissive areas 1622. In addition, the light-shielding area 161 of the first patterned layer 160 includes a first sub-light-shielding area 1611 and at least one second sub-light-shielding area 1612. The first sub-light-shielding area 1611 closely surrounds the light-transmissive area 162 and all second sub-light-shielding areas 1612. Each second sub-light-shielding area 1612 surrounds the corresponding second sub-light-transmissive area 1622. Due to there being no light-shielding material in the light-transmissive area 162, it has better light transmittancy (compared to the light-transmissive area 162 on which the light-shielding material is formed). In addition, each second sub-light-transmissive area 1622 has different shape or the same shape.

In another embodiment, the input device 100 may also omit the first patterned layer 160, or omit the first patterned layer 160 and the insulation element 140.

As illustrated in FIG. 1B, the microstructure layer 170 may be formed on the light guide element 120. For example, the microstructure layer 170 is formed on the first side 120S1 of the light guide element 120. In an embodiment, the microstructure layer 170 and the light guide element 120 may be integrated into one piece. The microstructure layer 170 includes, for example, a dot layer, a concave/convex structure layer or a combination thereof, which may include dots, concave structures, convex structures or a combination thereof, for changing the light effect or light traveling direction. In terms of manufacturing process, an imprinting technology (for example, using a roller) may be used to imprint the microstructure layer 170 on the light guide element 120, but the embodiment of the present invention is not limited to this. Furthermore, a roller with a structure corresponding to the microstructure layer 170 is provided, and after the roller is rolled on the light guide material, the microstructure layer 170 may be formed on the light guide material. In terms of materials, the microstructure layer 170 and the light guide element 120 may be formed of the same material.

As illustrated in FIGS. 5A to 5C, the microstructure layer 170 has, for example, multiple regions with different microstructure densities. For example, the microstructure layer 170 includes the first region 171 (for example, a cross-sectional region in FIG. 5A) and the second region 172 (for example, a cross-sectional region in FIG. 5B). The first region 171 and the second region 172 are located on the same layer (the same level). In an embodiment, the first region 171 and the second region 172 are different in microstructure density.

As illustrated in FIGS. 5A to 5C, the first region 171 corresponds to the light-transmissive area 162 (illustrated in FIG. 4) of the first patterned layer 160 along the direction Z of the input device 100, and the second region 172 corresponds to the light-shielding area 161 (illustrated in FIG. 4) of the first patterned layer 160 along the direction Z of the input device 100. The first region 171 has a first microstructure density, the second region 172 has a second microstructure density, and the first microstructure density is greater than the second microstructure density. As a result, compared with the second region 172, the light incident on the first region 171 may be emitted more concentratedly, thereby increasing the light intensity of the light traveling through the first region 171.

As illustrated in FIGS. 5A to 5C, the microstructure layer 170 includes the microstructures, which may cover the entire light guide element 120. From a microscopic perspective, as illustrated in an enlarged area in FIGS. 5B and 5C, the two microstructures of the microstructure layer 170 are separated. However, from a macro perspective, as illustrated in FIG. 5A, the entire light guide element 120 is covered by the microstructure layer 170 without any obvious fault (or blank) area of the microstructure. For example, as illustrated in FIG. 5B, the first region 171 includes first microstructures 1711, and as illustrated in FIG. 5A, the second region 172 includes second microstructures 1721. The shortest distance s1 between the entirety of these first microstructures 1711 and the entirety of these second microstructures 1721 is not greater than an interval h1 between two adjacent second microstructures 1712, or is not greater than an interval h2 between two adjacent first microstructures 1711, or ranges between the interval h2 and the interval h1. As a result, from a macro perspective, the first region 171 and the second region 172 are in close proximity (also referred to as "comprehensive distribution of microstructures"). In addition, the first microstructure 1711 includes, for example, a convex, a concave or a combination thereof, and the second microstructure 1721 includes, for example, a convex, a concave or a combination thereof. In terms of size, an outer diameter of each first microstructure 1711 ranges, for example, between 0.075 mm and 0.2 mm, and an outer diameter of each second microstructure 1721 ranges, for example, between 0.075 mm and 0.2 mm.

In the present embodiment, the microstructure layer 170 is formed on the first side 120S1 of the light guide element 120 as an example. In another embodiment, the microstructure layer 170 may be formed on the second side 120S2 of the light guide element 120. In other embodiment, the microstructure layer 170 may be formed on a surface 150S of the light-transmissive element 150 facing the insulation element 140.

As illustrated in FIGS. 1B and 6, the second patterned layer 180 is formed of, for example, a light-shielding material, such as black ink. The second patterned layer 180 is formed on the light-transmissive element 150 and has a light-shielding area 181 (a cross-sectional area illustrated in FIG. 6) and at least one light-transmissive area 182 (a non-cross-section area illustrated in FIG. 6), wherein the light-shielding area 181 is an area coated with black ink, and the light-transmissive area 182 is an area without black ink. Each light-transmissive area 182 includes at least one pattern, such as number, symbol, letter, etc., which are not limited in the embodiment of the present invention. The light-transmissive area 182 of the second patterned layer 180 may also be called a "window area". The light emitted from the light guide element 120 may travel through and illuminate the light-transmissive area 182 of the second patterned layer 180.

As illustrated in FIG. 6, the light-transmissive area 182 and at least one of the aforementioned light-transmissive area 162, the first hollow pattern area 130A2, the second hollow pattern area 130B2 and the third hollow pattern area 130C2 at least partially overlap along the directions Z of the input device 100. For example, the area of the light-transmissive area 182 projected on the first patterned layer 160 at least partially overlaps the light-transmissive area 162 (the light-transmissive area 162 is illustrated in FIG. 4), the area projected on the first adhesive layer 130A at least partially overlaps the first hollow pattern area 130A2 (the first hollow pattern area 130A2 is illustrated in FIG. 2) the area projected on the second adhesive layer 130B at least partially overlaps the second hollow pattern area 130B2 (the second hollow pattern area 130B2 is illustrated in FIG. 3), and the area projected on the third adhesive layer 130C at least partially overlaps the third hollow pattern area 130C2 (the third hollow pattern area 130C2 is illustrated in FIG. 1B). As a result, the light loss of the light traveling through these hollow pattern areas and light-transmissive areas is small, and the light intensity traveling through the light-transmissive area 182 of the second patterned layer 180 may be increased.

As illustrated in FIG. 6, the light-transmissive area 182 of the second patterned layer 180 includes a first sub-light-transmissive area 1821 and at least one second sub-light-transmissive area 1822. The first sub-light-transmissive areas 1821 surround all second sub-light-transmissive areas 1822. For example, the first sub-light-transmissive area 1821 closely surrounds all second sub-light-transmissive areas 1822. In addition, the light-shielding area 181 of the second patterned layer 180 includes a first sub-light-shielding area 1811 and at least one second sub-light-shielding area 1812. The first sub-light-shielding area 1811 closely surrounds the light-transmissive area 182 and all second sub-light-shielding areas 1812. Each second sub-light-shielding area 1812 surrounds the corresponding second sub-light-transmissive area 1822. Due to there being no light-shielding material in the light-transmissive area 182, it has better light transmittancy (compared to the light-transmissive area 182 on which the light-shielding material is formed). In addition, the second sub-light-transmissive regions 1822 have different shapes or the same shapes.

Figure 7A:
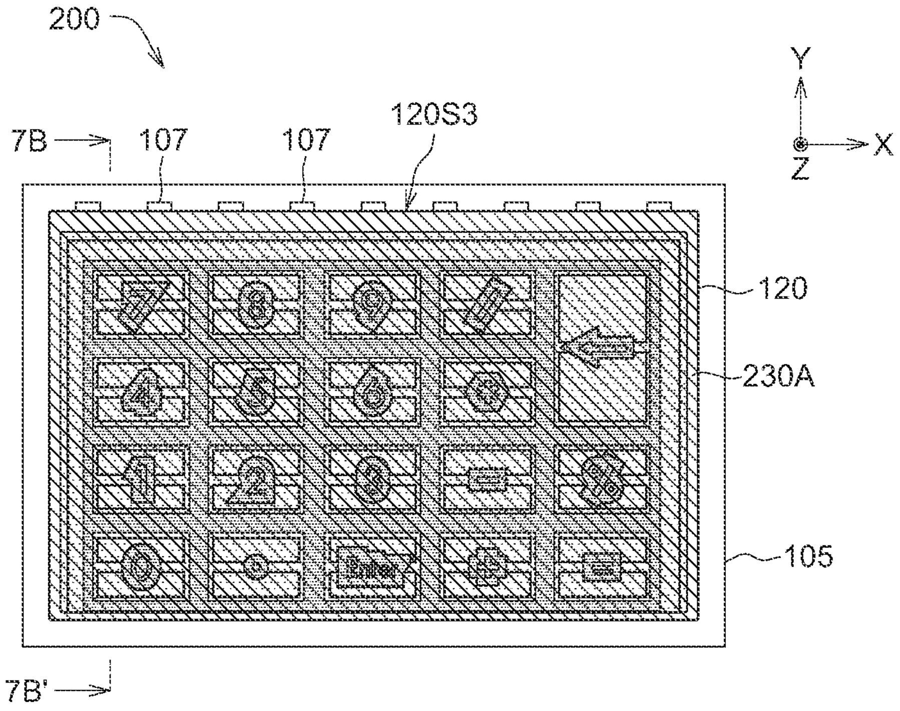
FIG. 7A illustrates a schematic diagram of a top view of an input device according to another embodiment of the present invention.
Figure 7B:
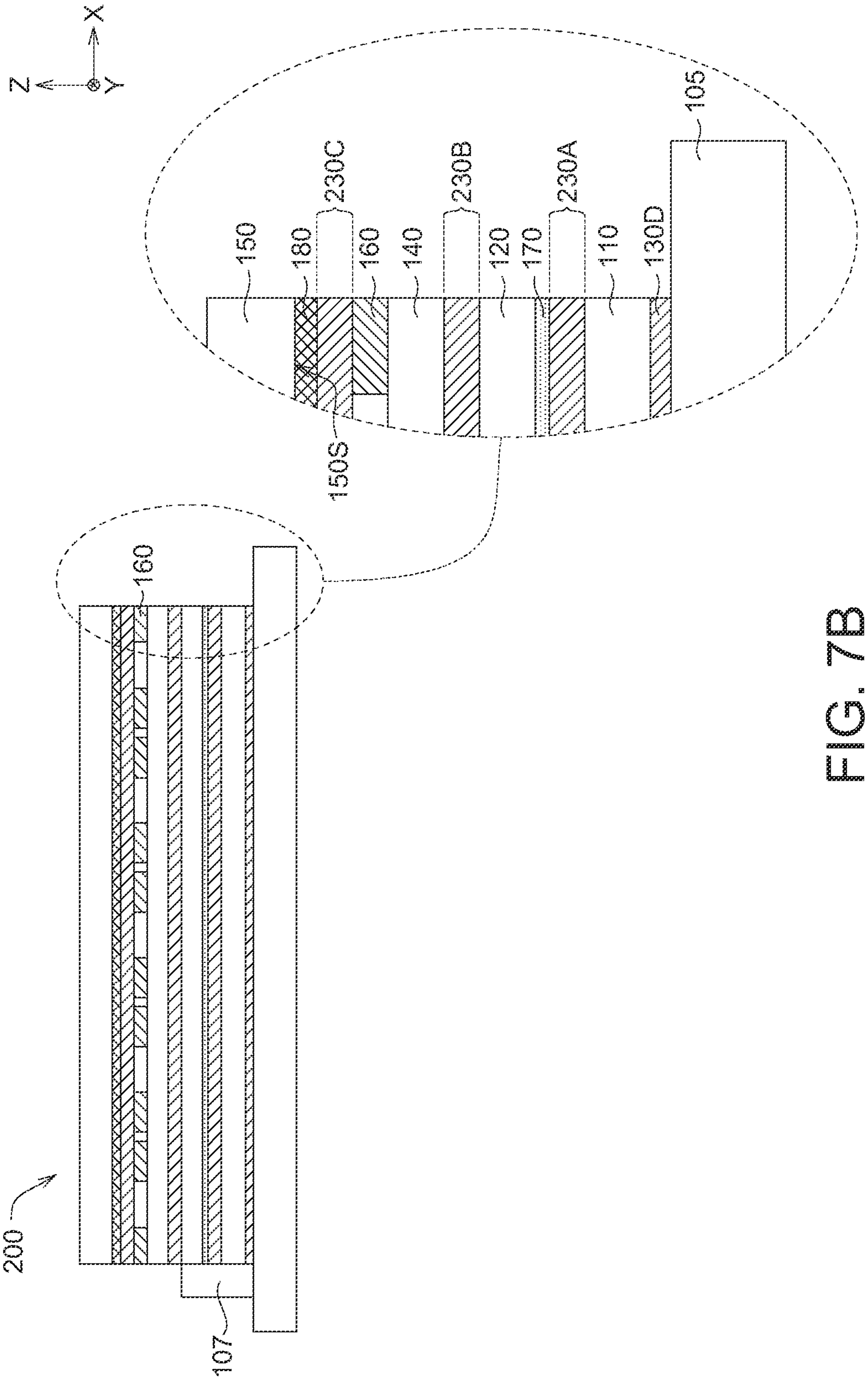
FIG. 7B illustrates a schematic diagram of a cross-sectional view of the input device in FIG. 7A along a direction 7B-7B'.

Referring to FIGS. 7A and 7B, FIG. 7A illustrates a schematic diagram of a top view of an input device 200 according to another embodiment of the present invention, and FIG. 7B illustrates a schematic diagram of a cross-sectional view of the input device 200 in FIG. 7A along a direction 7B-7B'.

The input device 200 includes the circuit board 105, at least one light source 107, the reflective element 110, the light guide element 120, a first adhesive layer 230A, a second adhesive layer 230B, a third adhesive layer 230C, the fourth adhesive layer 130D, the insulation element 140, the light-transmissive element 150, the first patterned layer 160, the microstructure layer 170 and the second patterned layer 180.

The input device 200 includes the technical features (for example, structure, material and/or connection relationship, etc.) the same as or similar as that of the aforementioned input device 100. One of the differences is that the first adhesive layer 230A, the second adhesive layer 230B and the third adhesive layer 230C are different from the first adhesive layer 130A, the second adhesive layer 130B and the third adhesive layer 130C in structure.

As illustrated in FIGS. 7A and 7B, the first adhesive layer 230A extends on the entire first side 120S1 of the light guide element 120. For example, the first adhesive layer 230A is an intact layer (for example, a full-surface coating layer), that is, the first adhesive layer 230A is a full-surface coating layer without a hollow pattern area. The first adhesive layer 230A extends from at least one of the side surfaces of the light guide element 120 to the others of the side surfaces of the light guide element 120. The first adhesive layer 230A may completely fill a gap between the reflective element 110 and the light guide element 120. The second adhesive layer 230B extends on the entire second side 120S2 of the light guide element 120. For example, the second adhesive layer 230B is an intact layer (for example, a full-surface coating layer), that is, the second adhesive layer 230B does not have a hollow pattern area. The second adhesive layer 230B extends from at least one of the side surfaces of the light guide element 120 to the others of the side surfaces of the light guide element 120. The second adhesive layer 230B may completely fill a gap between the insulation element 140 and the light-transmissive element 150. The third adhesive layer 230C extends continuously between the insulation element 140 and the light-transmissive element 150. For example, the third adhesive layer 230C is an intact layer (for example, a full-surface coating layer), that is, the third adhesive layer 230C does not have any hollow pattern area. The third adhesive layer 230C may completely fill a gap between the insulation element 140 and the light-transmissive element 150.

The adhesive layer material herein may be, for example, joining glue or double-sided tape formed of polymer materials such as silicone, acrylic resin, epoxy resin, polyester, and polyurethane. The light transmittance of the adhesive layer is, for example, greater than 80%, preferably between 85% and 98%. The refractive index of the adhesive layer is similar to the refractive index of the adjacent joint components (such as the insulation element, the light guide element, or the microstructure layer, etc.). As a result, the adhesive layer will not easily affect the light effect displayed on the input device after the light traveling through the adhesive layer.

Figure 8:
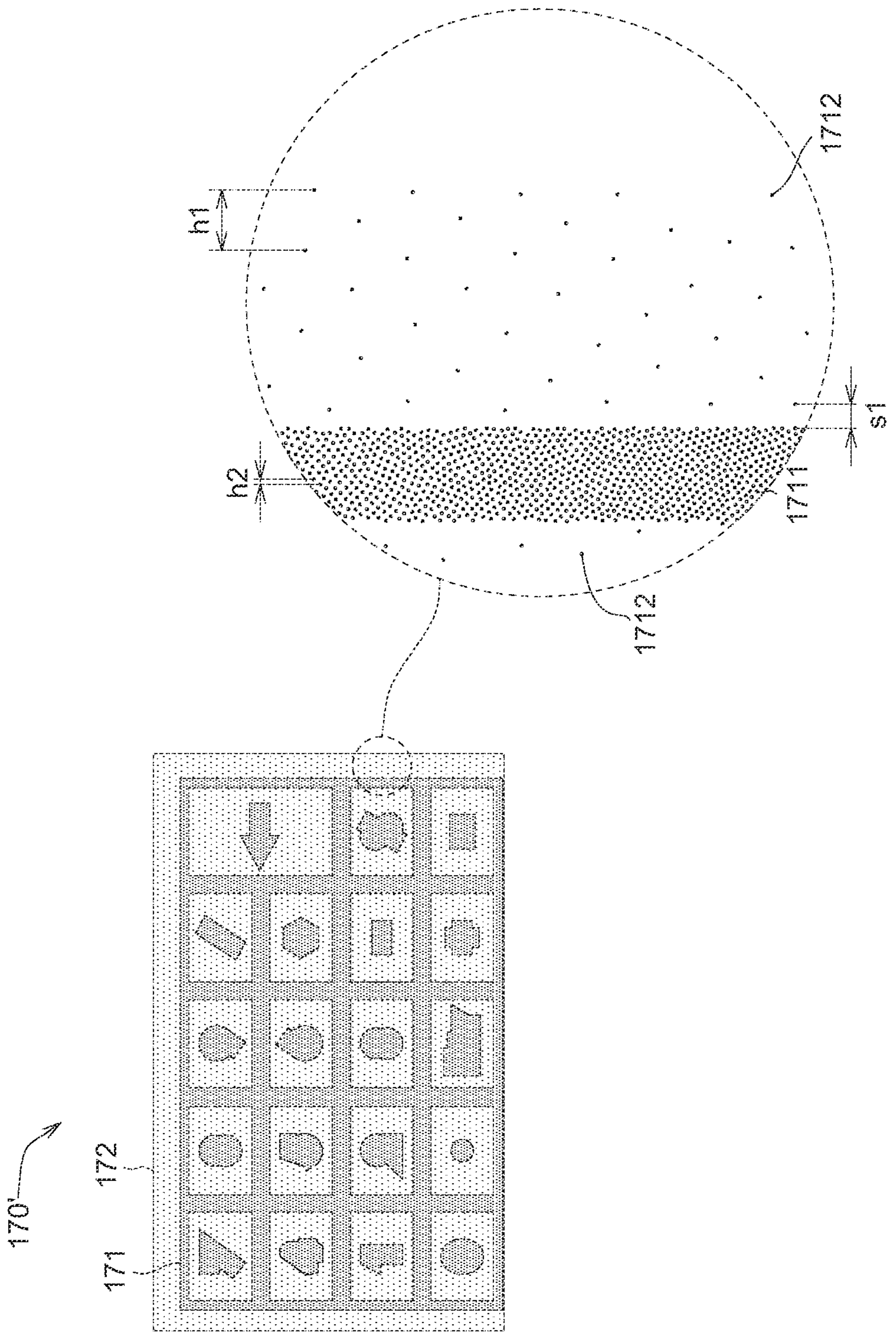
FIG. 8 illustrates a schematic diagram of a top view of the microstructure layer according to another embodiment of the present invention.

Referring to FIG. 8, FIG. 8 illustrates a schematic diagram of a top view of the microstructure layer 170' according to another embodiment of the present invention. The microstructure layer 170' includes the microstructures which may cover the entire light guide element 120. From a microscopic perspective, as illustrated in an enlarged area of FIG. 8, two microstructures of the microstructure layer 170 are separated. In the present embodiment, the microstructures of the microstructure layer 170' are randomly arranged. From a macro perspective, the entire light guide element 120 is covered by the structural layer 170 without any obvious fault (blank) area of the microstructure.

For example, as illustrated in FIG. 8, the first region 171 includes first microstructures 1711, and the second region 172 includes second microstructures 1721. The shortest distance s1 between the entirety of first microstructures 1711 and that of the second microstructure 1721 is not greater than the distance h1 between two adjacent second microstructures 1712, or is not greater than a distance h2 between two adjacent first microstructures 1711, or ranges between the distance h2 and the distance h1. As a result, from a macro perspective, the first region 171 and the second region 172 are in close proximity (also referred to as "comprehensive distribution of microstructures"). In addition, the first microstructure 1711 includes, for example, a convex, a concave or a combination thereof, and the second microstructure 1721 includes, for example, a convex, a concave or a combination thereof. In terms of size, each first microstructure 1711 has an outer diameter ranging between, for example, 0.075 mm and 0.2 mm, and each second microstructure 1721 has an outer diameter ranging between, for example, between 0.075 mm and 0.2 mm.

In summary, the input device includes a light guide element, a first adhesive layer and a second adhesive layer, wherein the first adhesive layer and the second adhesive layer are respectively located on two relative sides of the light guide element. The first adhesive layer and the second adhesive layer respectively have a first pattern and a second pattern, wherein the first pattern and the second pattern are similar and/or at least partially overlap along a direction. As a result, a hollow area of the first pattern and a hollow area of the second pattern may at least partially overlap along the direction, thereby reducing the light loss of light traveling through these hollow areas. In an embodiment, the input device further includes a microstructure layer formed on one of the two relative sides of the light guide element. The microstructure layer has multiple regions with different microstructure densities. Each region includes multiple microstructures, and the interval between two adjacent of these microstructures is substantially equal; or, these microstructures may be arranged irregularly (or randomly), and the interval between two adjacent of these microstructures may be different. In another embodiment, the interval between two adjacent regions is substantially equal to or not greater than the interval between two adjacent microstructures in one of the two adjacent regions. As a result, the two adjacent regions of the microstructure layer are in close proximity viewed from a macro perspective, and there will be no obvious discontinuities or gaps. In other embodiments, the first adhesive layer may continuously extend on the first side of the light guide element, and the second adhesive layer may continuously extend on the second side of the light guide element, wherein the first adhesive layer and the second adhesive layer overlap along the direction in areas where the density of the microstructure is greater or greatest. In an embodiment, the first adhesive layer and/or the second adhesive layer are, for example, intact layers (e.g., full-surface coating layers), that is, without any hollow pattern.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. An input device, comprising:

a light guide element having a first side and a second side relative to the first side;

a first adhesive layer being disposed corresponding to the first side and comprising a first substance portion; and a second adhesive layer being disposed corresponding to the second side and comprising a second substance portion;

wherein the first substance portion and the second substance portion overlap in an orientation of the input device;

wherein the first adhesive layer has a first hollow pattern area, the second adhesive layer has a second hollow pattern area, and the first hollow pattern area and the second hollow pattern area overlap in the orientation of the input device.

2. The input device according to claim 1, further comprising:

a light-transmissive element; and a patterned layer being disposed on the light-transmissive element and having a light-shielding area;

wherein the first substance portion and the second substance portion overlap the light-shielding area in the orientation.

3. The input device according to claim 2, further comprising:

an insulation element; and a third adhesive layer disposed between the light-transmissive element and the insulation element and comprising a third substance portion;

wherein the first substance portion, the second substance portion and the third substance portion overlap in the orientation of the input device.

4. The input device according to claim 1, further comprising:

an insulation element; and a patterned layer being disposed on the insulation element and having a light-shielding area;

wherein the first substance portion, the second substance portion and the light-shielding area overlap in the orientation.

5. The input device according to claim 1, further comprising:

a light-transmissive element;

a patterned layer being disposed on the light-transmissive element and having a light-transmissive area and a light-shielding area; and a microstructure layer being disposed on the light guide element and comprising a first region and a second region;

wherein the first region corresponds to the light-transmissive area in the orientation, the second region corresponds to the light-shielding area in the orientation, the first region has a first microstructure density, the second region has a second microstructure density, and the first microstructure density is greater than the second microstructure density.

6. The input device according to claim 5, wherein the first region comprises first microstructures, the second region comprises second microstructures, a shortest distance between an entirety of the first microstructures and an entirety of the second microstructures is not greater than an interval between two adjacent second microstructures.

7. An input device, comprising:

a light guide element having a first side and a second side relative to the first side;

a microstructure layer being disposed on the light guide element and comprising a first region and a second region; and a first adhesive layer being disposed corresponding to the first side; and a second adhesive layer being disposed corresponding to the second side;

wherein the first region overlaps a light-transmissive area in an orientation of the input device, the second region overlaps a light-shielding area in the orientation, the first region has a first microstructure density, the second region has a second microstructure density, and the first microstructure density is different from the second microstructure density;

wherein the first adhesive layer has a first hollow pattern area, the second adhesive layer has a second hollow pattern area, and the first hollow pattern area and the second hollow pattern area overlap in the orientation of the input device.

8. The input device according to claim 7, wherein the first microstructure density is greater than the second microstructure density, the first region comprises first microstructures, the second region comprises second microstructures, and a shortest distance between an entirety of the first microstructures and an entirety of the second microstructures is not greater than a first interval between two adjacent second microstructures and a second interval between two adjacent second microstructures.

9. The input device according to claim 7, wherein the first adhesive layer comprises a first substance portion the second adhesive layer comprises a second substance portion, and the first substance portion and the second substance portion overlap in the orientation of the input device.

10. The input device according to claim 9, further comprising:

a light-transmissive element; and a patterned layer being disposed on the light-transmissive element and having the light-shielding area;

wherein the first substance portion and the second substance portion overlap the light-shielding area in the orientation.

11. The input device according to claim 10, further comprising:

an insulation element; and a third adhesive layer being disposed between the light-transmissive element and the insulation element and comprising a third substance portion;

wherein the first substance portion, the second substance portion and the third substance portion overlap in the orientation of the input device.

12. The input device according to claim 9, further comprising:

an insulation element; and a patterned layer being disposed on the insulation element and having the light-shielding area;

wherein the first substance portion, the second substance portion and the light-shielding area overlap in the orientation.

13. An input device, comprising:

a light guide element having a first side and a second side relative to the first side;

a microstructure layer being disposed on the light guide element and comprising a first region and a second region, wherein the first region has a first microstructure density, the second region has a second microstructure density, and the first microstructure density is different from the second microstructure density;

a first adhesive layer continuously extending on the first side; and a second adhesive layer continuously extending on the second side;

wherein the first adhesive layer and the second adhesive layer overlap the first region in an orientation of the input device;

wherein the first adhesive layer has a first hollow pattern area, the second adhesive layer has a second hollow pattern area, and the first hollow pattern area and the second hollow pattern area overlap in the orientation of the input device.

14. The input device according to claim 13, further comprising:

a light-transmissive element; and a patterned layer being disposed on the light-transmissive element and having a light-transmissive area;

wherein the first adhesive layer and the second adhesive layer overlap the light-transmissive area in the orientation.

15. The input device according to claim 13, further comprising:

a light-transmissive element;

an insulation element; and a third adhesive layer disposed between the light-transmissive element and the insulation element;

wherein the third adhesive layer overlap the first region in the orientation.

16. The input device according to claim 13, further comprising:

an insulation element; and a patterned layer being disposed on the insulation element and having a light-transmissive area;

wherein the first adhesive layer, the second adhesive layer and the light-transmissive area overlap in the orientation.

17. The input device according to claim 13, wherein the first region comprises first microstructures, the second region comprises second microstructures, and a shortest distance between an entirety of the first microstructures and an entirety of the second microstructures is not greater than an interval between two adjacent second microstructures.

* * * * *